Figure 1:
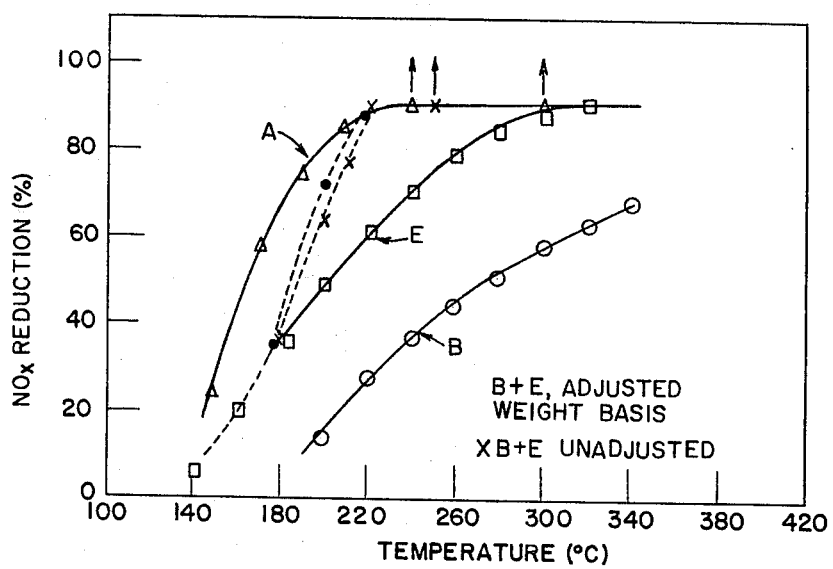

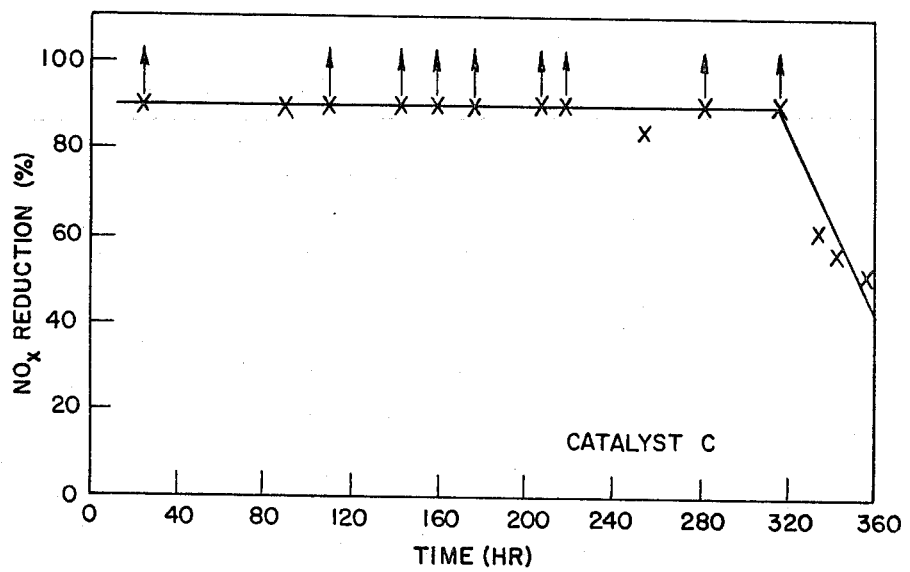
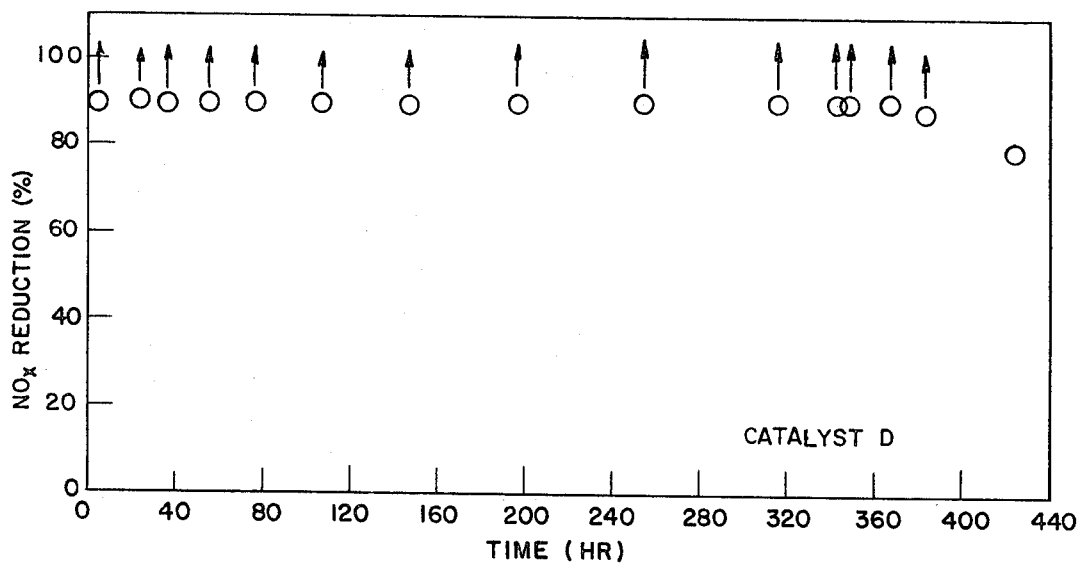

3,398,101
PREREDUCED CUPRIC OXIDE-COBALTIC OXIDE REDOX CATALYSTS

Robert A. Baker, West Chester, and Robert C. Doerr, Philadelphia, Pa., assignors to International Copper Research Association Inc.
Filed Nov. 22, 1963, Ser. No. 325,625
1 Claim. (Cl. 252—466)

This invention relates to a copper containing redox catalyst which is effective for promoting the oxidation and reduction of various chemical compounds under different reaction conditions. It has been found to be especially effective in the treatment of exhaust gases from hydrocarbon combustion engines to control the emission of noxious components, carbon monoxide, hydrocarbons and oxides of nitrogen therein.

Several chemicals, particularly copper chromites have been found to exert catalytic effects in the treatment of automobile exhaust to remove selectively its noxious components. They promote the oxidation of carbon monoxide and hydrocarbons in an oxidizing atmosphere and the reduction of oxides of nitrogen in the reducing medium in the presence of a reducing agent. These catalysts, however, undergo severe attrition after having been subject to several cycles of oxidation and reduction and lose their effectiveness. Furthermore, the catalytic activities of these compounds decrease rapidly during the treatment of the exhaust, especially the leaded exhaust. The instability of these catalysts as the result of low resistance to mechanical, chemical and thermal attritions which contribute to their short catalytic lives and their rapidly decreasing effectiveness when exposed to the leaded exhaust reduces their usefulness for catalytic treatment of automobile exhaust.

We have found that a catalyst having cobaltic oxide and cupric oxide provides superior catalytic performance for promoting the reduction of oxides of nitrogen in the presence of a reducing agent such as carbon monoxide. This catalyst has exceptionally high stability in resisting attritions and has a catalytic life of more than 350 hours under normal operating conditions. It has also been found to be effective in promoting the oxidation of various chemicals, particularly the carbon monoxide and hydrocarbons in the exhaust gases of internal combustion engines, rendering it particularly desirable for the treatment of automobile exhaust in a homogeneous two-stage device. This device will reduce the oxides of nitrogen in the first stage and oxidize the remaining carbon monoxide and the hydrocarbons in the second state with the assistance of external oxygen.

Broadly stated, the redox catalyst composition of this invention consists essentially of cobaltic oxide, cupric oxide and a catalytic carrier. The ratio of the oxides in the composition is one part of cobaltic oxide to about 3 to 35 parts of cupric oxide by weight. While any catalytic carrier that will not substantially interfere with the activity of the catalyst can be used in preparing the catalyst of this invention, we find aluminum hydroxide is eminently suitable. Other satisfactory carriers include silica, alumina and Carborundum. Conventional methods for preparing this catalyst may be used and the catalyst prepared can be a homogeneous mixture in the form of an unsupported catalyst, or a heterogeneous mixture in the form of a supported catalyst. The amount of catalytic carrier in the composition can be varied within a broad range depending on a number of variables such as the ratio of oxides in the catalyst, the carrier used, and the desired physical characteristics of the catalyst. For a homogeneous unsupported catalyst using aluminum hydroxide as a catalytic carrier, a suitable catalyst has 2 to 15% by weight of cobaltic oxide, 50 to 70% by weight of cupric oxide, and the balance being the carrier.

In the preferred method of preparing a homogeneous unsupported catalyst, suitable amounts of oxides within the stated range are mixed with a catalytic carrier. After they have been uniformly mixed, the resulting mixture is pelletized and treated in an atmosphere of carbon monoxide. We found that this prereduced catalyst has exceptionally good stability and resistance to chemical attrition in promoting the reduction of oxides of nitrogen in the exhaust.

In the treatment of exhaust gases, the catalyst of this invention promotes the reaction of oxides of nitrogen and carbon monoxide present in the exhaust in a manner substantially represented by the following chemical equation showing the reaction of nitrogen monoxide and carbon monoxide

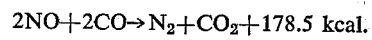

$$2NO + 2CO \rightarrow N_2 + CO_2 + 178.5 \text{ kcal.}$$

This exothermic reaction has a relatively high initial reaction temperature. However, once this temperature is reached, the rate of reduction increases rapidly with increasing temperature until the temperature reaches a second level at which the reduction of oxides of nitrogen is substantially completed and further temperature rise has very little effect in the reduction process. The exact kinetic mechanism of this process is not well known. The presence of a high level of $N_2O$ between the initial reaction temperature and the total reaction temperature suggests a step-wise reaction

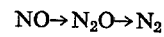

$$NO \rightarrow N_2O \rightarrow N_2$$

or simultaneous reactions involving

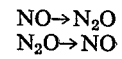

$$NO \rightarrow N_2O$$
$$N_2O \rightarrow NO$$

and

$$NO \rightarrow N_2$$

In either mode of reaction the presence of $N_2O$ demonstrates that the reduction of oxides of nitrogen is only partially completed until a critical temperature is reached.

Figure 2:
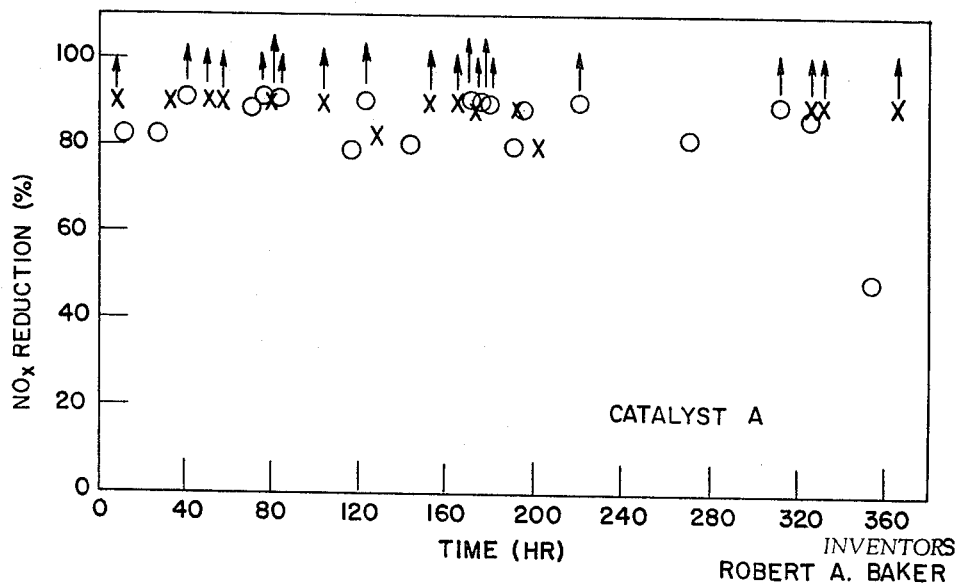

The effect of temperature in the reduction of oxides of nitrogen and other important characteristics of the catalyst of this invention are described in greater detail hereinbelow with reference to the accompanying drawing wherein FIG. 1 is a graph showing the temperature effects in the reduction of nitrogen monoxide of various catalysts and the synergism of the catalyst of this invention, FIGS. 2, 3 and 4 are graphs showing the catalytic life of catalysts containing various ratios of oxides.

Five specific catalysts were prepared for the purpose of illustrating this invention. The initial composition, the hardness and the surface areas of these catalysts are tabulated in Table I. The catalysts designated as "A," "C" and "D" contained both cupric oxide and cobaltic oxide of different oxidic ratios within the broad range previously stated. The catalysts "B" and "E" contained only a single oxide in each catalyst, not within the scope of this invention, and were used for the purpose of comparison. Both of these catalysts were relatively soft and their hardness was not recorded in Table I. The surface area of catalyst "B" was also omitted from the table. Although catalysts "A," "C" and "D" were only specific examples, their different compositions represent the preferred range for the catalyst of this invention.

TABLE I

| Catalyst | CuO | Co$_2$O$_3$ | Al(OH)$_3$ | Hardness, kgm. | Surface Area (m.$^2$/gm.) |
|---|---|---|---|---|---|
| A | 62 | 5 | 33 | 13 | 51 |
| B |  | 5 | 95 | Soft |  |
| C | 62 | 2.5 | 35.5 | 5.7 | 68 |
| D | 62 | 10 | 28 | 14 | 72 |
| E | 67 |  | 33 | Soft | 83 |

These five catalysts were prepared by dry mixing the specific amounts of chemicals stated in Table I. After the chemicals in powder form were thoroughly mixed and ground to assure uniformity, they were pelletized into ⅛-inch diameter and ⅛-inch long cylinders. These cylinders were then placed in an atmosphere of carbon monoxide at 450° C. to 500° C. for about eight hours to prereduce the catalysts. The prereduced pellets were reground and repelletized to their previous dimensions for catalytic uses.

To test their effectiveness in reducing the nitrogen oxides at different temperatures, a table top experimental system was used. The system utilized individually regulated tank gases of nitric oxide and carbon monoxide in a nitrogen atmosphere. The system consisted of a preheater and a reactor housed in an experimental furnace. The furnace was made by enclosing a 2400 watt heater in an aluminum shell approximately eleven inches in diameter and twenty-six inches high, equipped with a stirrer mounted on the base to assure uniform heat distribution and an indicating controller to regulate the temperature. The preheater, which served to bring the inlet gases to the desired temperature prior to their entry to the reactor, was a thin wall one inch diameter stainless steel tube twenty-four inches long packed with Pyrex beads.

The catalytic reactor was a 1¼ inches diameter stainless steel pipe about 15 inches long, which was threaded and fitted with end caps to facilitate catalyst removal and servicing. One end of the reactor was modified to take a megopak, iron-constantan thermocouple encased in a ⅟₁₆-inch stainless steel sheath. The thermocouple was fastened through the end cap with conax fittings and asbestos glands to keep them gas tight. A ³⁄₃₂-inch thin-walled stainless steel tube along the central axis served as a well for movement of an internal thermocouple for monitoring catalyst bed temperatures as a function of depth. The thermocouples were connected to a multichannel recorder which provided continuous readings at five second intervals. The outer surface of the reactor was wound with a four foot by ½-inch, 192 watt glass covered heating tape which in turn was asbestos lagged. The temperature control was regulated by individual variacs.

In the test, approximately 50 cc. of catalyst "A" was placed on the catalyst bed in the reactor, which was supported on about 60 cc. of 5 mm. Pyrex glass beads. The gases from the tanks were regulated to provide gases containing 1500 p.p.m. of NO and about 1% CO in nitrogen with a space velocity (volume of gas per bulk volume of catalyst per hour) of 12,000 hours$^{-1}$. The gases entered the preheater first and the temperature of the gases was quickly brought to the desired temperature. After the preheating step, the gases entered the reactor to effect the desired reduction. The percents of nitrogen oxide reduced for each reaction temperature were recorded and the data were presented graphically as marked in FIG. 1.

Similar tests were made for catalyst "B" and "E" and the results were also presented graphically in FIG. 1 for comparison. It is apparent that catalyst "A," which contains both oxides, has a superior catalytic performance, which promotes about 20% nitrogen oxides reduction at about 140° C. and about 90% nitrogen oxides reduction at about 220° C. As a contrast, catalysts "B" and "E" reduce 20% nitrogen oxides at about 190° C. and about 150° C., respectively. In fact, the combined effect of these two catalysts at temperatures below the complete reaction temperature which is indicated by dotted lines, falls short of that of catalyst "A" both in unadjusted weight basis and adjusted weight basis. This unexpected showing demonstrates the synergism of this catalyst.

A second experimental device utilizing a 1947 Ford V–8 engine burning regular grade leaded gasoline was used to provide exhaust gases for tests to determine the effectiveness and the life of the catalyst. The engine was equipped with a closed cooling system with excess heat discharged by exchange with water in a shell and tube exchanger. The temperature was controlled by adjusting the cooling water rate in the heat exchnager. The unloaded engine produced sufficient carbon monoxide and hydrocarbon, but was lacking in oxides of nitrogen. Nitric oxide was added from a reagent tank under flow control and rotameter indication at a tap in the exhaust line ahead of the muffler to simulate the loaded conditions.

The tailpipe consisted of a seven-foot section of galvanized pipe with a 1¼ inches gate valve at the end to control back pressure at the reactor. Four ¼-inch stainless steel tubes were tapped to the pipe at four points as leads to the reactors. The flow to the reactors was regulated by individual ¼-inch stainless steel valves. valves. The reactors used in this experimental device were similar to those used in the table top experiments.

All five catalysts were tested under similar conditions. The space velocity for these tests was maintained at 10,000 hr.$^{-1}$. The results were tabulated in Table II. For the catalysts "A," "C" and "D," the percents of nitrogen oxides reduced with respect to time were presented graphically in FIGS. 2, 3 and 4 respectively. In all the graphs the arrows pointing upward indicating the reduction of nitrogen oxides were above 90%.

TABLE II

| Catalyst | Percent NO$_x$ Average | Reduced Range | Temperature, ° C. | Length of Test, hours |
|---|---|---|---|---|
| A | 85 | 95–50 | 400–500 | 353 |
| A | 90 | >90–78 | 480–510 | 366 |
| B | 46 | 46–47 | 475–500 | 18 |
| C | >90 | >90 | 450–515 | 315 |
|   |   | >90–51 | 505–515 | 315–375 |
| D | >90 | >90 | 480–500 | 368 |
|   | 85 | 90–79 | 480–500 | 368–425 |
| E | 0 | 0 | 440 | 13 |

The inability of both catalysts "B" and "E" to sustain the test was the result of severe attrition. These two catalysts were found to be partially reduced and severely cracked or broken after 18 and 13 hours respectively. As a comparison, the catalysts of this invention were found to be in good condition after more than 350 hours of continuous tests. The catalysts "A," "C" and "D" were capable of reducing more than 90% of the nitrogen oxides for a major portion of the test.

During the life test of these catalysts, spot tests were made to determine their effectiveness in promoting the oxidation of carbon monoxide and hydrocarbons present in the exhaust. With supplemental oxygen added, it was found that the catalysts of this invention oxidized at least 60% carbon monoxide and 70% hydrocarbons. For example, catalyst "A" oxidized 67% carbon monoxide and 71% hydrocarbons in the exhaust at 500° C. and a space velocity of 10,000 hr.$^{-1}$. The total exposure time for this catalyst in both oxidizing and reducing mediums was 371 hours.

In a separate test, catalyst "A" was heated to 1800° F. for one hour and 1600° F. for seven hours in air. This heated catalyst was tested and found to be equal to the unheated catalyst in effectiveness The remarkable thermal stability of the catalyst of this invention further enhances its superior catalytic performance.

While the tests were conducted with exhaust gases, the use of this catalyst is not so limited. We found, for example, that it is an effective catalytic additive to modify the combustion rates of propellant contained nitrogen oxides as a combustion intermediate. Indeed, its high resistance to attritions and high catalytic activity both as a reducng promoter and as an oxidizing promoter increases its commercial application when such properties are essential to promote the chemical reactions.

We claim:

1. A catalyst for catalytic reduction of nitrogen oxides consisting essentially of a homogeneous mixture of cobaltic oxide, cupric oxide, and aluminum hydroxide, pre-treated in an atmosphere of carbon monoxide for about 8 hours at about 450° C. to 500° C., said mixture having an initial composition containing 2.5% to 10% by weight of cobaltic oxide, about 62% by weight of cupric oxide, and the balance aluminum hydroxide, having an effective life for catalytic reduction of nitrogen oxide containing gas of more than 350 hours at a temperature above 450° C.

References Cited

UNITED STATES PATENTS

| | | | |
|---|---|---|---|
| 3,179,488 | 4/1965 | Appell | 23—2.2 |
| 3,271,324 | 9/1966 | Stephens et al. | 252—466 |
| 1,399,807 | 12/1921 | Scott | 252—466 X |
| 2,106,597 | 1/1938 | Ferguson | 252—447 X |
| 2,229,199 | 1/1941 | Voorhies | 252—473 X |
| 2,451,485 | 10/1948 | Hearne et al. | 252—443 X |
| 2,492,986 | 1/1950 | Hach | 252—466 X |
| 3,133,029 | 5/1964 | Hoekstra | 252—466 |
| 3,224,981 | 12/1965 | Stephens et al. | 252—466 X |
| 3,226,340 | 12/1965 | Stephens et al. | 23—2.2 X |

OTHER REFERENCES

Newsome et al., "Alumina Properties," Technical Paper No. 10, Alcoa, Pittsburgh, Pa., 1960, pages 8 to 10.

Newsome et al., "Alumina Properties," Technical Paper No. 10, Alcoa, Pittsburgh, Pa., 1960, p. 46 (Table 12)

DANIEL E. WYMAN, *Primary Examiner.*

P. KONOPKA, *Assistant Examiner.*